United States Patent
Bartsch et al.

(10) Patent No.: US 6,607,815 B2
(45) Date of Patent: Aug. 19, 2003

(54) COEXTRUDED, BIAXIALLY ORIENTED POLYESTER FILM WITH GOOD METAL ADHESION AND PROCESS FOR ITS PRODUCTION

(75) Inventors: Stefan Bartsch, Wiesbaden (DE); Herbert Peiffer, Mainz (DE)

(73) Assignee: Mitsubishi Polyester Film GmbH (DE)

( * ) Notice: Subject to any disclaimer, the term of this patent is extended or adjusted under 35 U.S.C. 154(b) by 0 days.

(21) Appl. No.: 09/908,160

(22) Filed: Jul. 18, 2001

(65) Prior Publication Data

US 2002/0051872 A1 May 2, 2002

(30) Foreign Application Priority Data

Aug. 4, 2000 (DE) .......................... 100 38 131

(51) Int. Cl.$^7$ .................... B32B 15/08; B32B 27/08; B32B 27/20; B32B 27/36; B32B 31/16
(52) U.S. Cl. .................... 428/216; 428/323; 428/213; 428/215; 428/332; 428/339; 428/480; 428/910; 428/457; 428/458; 428/343; 428/344; 428/346; 428/347; 428/349; 264/288.4; 264/290.2
(58) Field of Search .................... 428/480, 457, 428/458, 910, 323, 903.3, 332, 339, 213, 215, 216, 343, 344, 347, 346, 349; 264/288.4, 290.2, 289.3

(56) References Cited

U.S. PATENT DOCUMENTS

| 4,605,591 A | * | 8/1986 | Nose et al. ............... 427/412.5 |
| 4,643,925 A | * | 2/1987 | Smith et al. ............... 428/36.6 |
| 4,687,699 A |   | 8/1987 | Hensel et al. |
| 4,978,740 A | * | 12/1990 | Kawamoto et al. .... 428/694 SL |
| 5,164,248 A | * | 11/1992 | Fleury et al. .......... 156/244.11 |
| RE34,727 E | * | 9/1994 | Utsumi et al. ........... 264/210.7 |
| 5,380,587 A | * | 1/1995 | Musclow et al. ........... 428/353 |
| 5,897,959 A | * | 4/1999 | Kim et al. .................. 428/480 |

FOREIGN PATENT DOCUMENTS

| EP | 0 035 835 A1 | 9/1981 |
| EP | 0 144 878 A2 | 6/1985 |
| EP | 0 580 404 A2 | 1/1994 |
| EP | 1 055 515 A3 | 11/2000 |
| JP | 02057339 A | 2/1990 |

* cited by examiner

Primary Examiner—Vivian Chen
(74) Attorney, Agent, or Firm—ProPat, L.L.C.

(57) ABSTRACT

The invention describes a biaxially oriented polyester film with at least one base layer B, with at least one metal-adherent outer layer A, and preferably with another outer layer C, the metal-adherent outer layer A having a metal adhesion of at least 4 N/25 mm wherein the metal adherent layer consists essentially of an amorphous copolyester comprising ethylene terephthalate and ethylene isophthalate units.

14 Claims, No Drawings

COEXTRUDED, BIAXIALLY ORIENTED POLYESTER FILM WITH GOOD METAL ADHESION AND PROCESS FOR ITS PRODUCTION

BACKGROUND OF THE INVENTION

The invention relates to a coextruded, biaxially oriented polyester film with high metal adhesion, composed of a base layer B and of at least one outer layer A applied to the base layer. The invention also includes the use of the film and a process for its production.

EP-A-0 144 878 describes films with a copolyester coating, based on isophthalic acid, on aliphatic dicarboxylic acid and on sulfoisophthalic acid. The films do have good adhesion to metals, but this metal adhesion is unsatisfactory for certain applications.

EP-A-0 035 835 describes a polyester film which comprises a sealable outer layer based on isophthalate units. This outer layer has a high thickness, $\geq 2$ µm, leading to cracking in the metallic layer after metallization, which is unacceptable since it leads to loss of barrier properties.

It was an object of the present invention to provide a biaxially oriented polyester film which has high metal adhesion and does not have the disadvantages of the prior art films mentioned and which, in addition, is cost-effective to produce and has good processability while its other optical properties are unchanged or improved. A particular object of the present invention was to improve the metal adhesion of the film without any occurrence of cracking in the metallic layer of the metallized film. In addition, the film should be capable of processing on high-speed machinery. It should also be ensured that during the production of the film (without the metallic layer) any cut material directly associated with film production should be capable of reintroduction as regrind into the extrusion process for film production in amounts of up to 60% by weight, based on the total weight of the film, without any resultant significant adverse effect on the physical properties of the film produced with this amount of regrind.

The film therefore has excellent suitability for use in flexible packaging, and specifically wherever high metal adhesion is particularly important. An example of a case of this type is also known as "bag-in-box packs", which use a multilayer composite made from metallized PET film, laminated to both sides of which there is a polyethylene film.

SUMMARY OF THE INVENTION

According to the invention, the object is achieved by providing a coextruded, biaxially oriented polyester film with good metal adhesion, where the polyester film has at least one base layer B and at least one outer layer A, and where the outer layer A has
(a) a metal adhesion (after metallization) above or equal to 4 N/25 mm and
(b) a thickness below or equal to 1.6 µm.

The film of the present invention exhibits exceptionally high adhesion to metallic coatings and, surprisingly, no cracking in the metallic layer applied to the outer layer A.

DETAILED DESCRIPTION OF THE INVENTION

The film of the invention has at least two layers, and in this embodiment the layers present are the base layer B and the metal-adherent outer layer A. For the purposes of the present invention, an "metal-adherent" outer layer A is an outer layer composed of a plastic whose chemical makeup gives it a particularly high affinity for metal and which therefore has particularly good properties of metal adhesion.

However, the film of the invention particularly preferably has three layers and then also encompasses an additional outer layer C, which may be identical with or different from the metal-adherent outer layer A. The subclaims give preferred embodiments of the invention, and these are also described in more detail below.

At least 90% by weight of the base layer B of the film is preferably composed of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT), or else made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters at least 90 mol %, in particular at least 95 mol %, of which is composed of ethylene glycol units and terephthalic acid units, or of ethylene glycol units and naphthalene-2,6-dicarboxylic acid units. The remaining monomer units derive from other aliphatic, cycloaliphatic or aromatic diols and, respectively, dicarboxylic acids, as may also occur in layer A (or in layer C).

Other examples of suitable aliphatic diols are diethylene glycol, triethylene glycol, aliphatic glycols of the formula HO—(CH$_2$)$_n$—OH, where n is an integer from 3 to 6 (in particular 1,3-propanediol, 1,4-butanediol, 1,5-pentanediol and 1,6 hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—C$_6$H$_4$—X—C$_6$H$_4$—OH, where X is —CH$_2$—, —C(CH$_3$)$_2$—, —C(CF$_3$)$_2$—, —O—, —S— or —SO$_2$—. Bisphenols of the formula HO—C$_6$H$_4$—C$_6$H$_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the C$_3$-C$_{19}$ alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

Metal-adherent Outer Layer A

The metal adherent outer layer A preferably applied by coextrusion to the base layer B has been built up on the basis of copolyesters and essentially consists of copolyesters composed predominantly of isophthalic acid units and of terephthalic acid units and of ethylene glycol units. The remaining monomer units derive from other aliphatic, cycloaliphatic or aromatic diols and, respectively, dicarboxylic acids, as may also occur in the base layer. Preferred copolyesters which have the desired metal adhesion properties are those which have been built up from ethylene terephthalate units and from ethylene isophthalate units and from ethylene glycol units. The proportion of ethylene terephthalate is preferably from 40 to 99 mol %, and the corresponding proportion of ethylene isophthalate is preferably from 60 to 1 mol %. Particular preference is given to copolyesters in which the proportion of ethylene terephthalate is from 50 to 95 mol % and the corresponding proportion of ethylene isophthalate is from 50 to 5 mol %, and very particular preference is given to copolyesters in which the proportion of ethylene terephthalate is from 60 to 85 mol % and the corresponding proportion of ethylene isophthalate is from 40 to 15 mol %.

Non-metal-adherent Outer Layer C

For the other, non-metal-adherent outer layer C, or for any intermediate layers present, use may be made in principle of the polyesters described above for the base layer B. In addition to this, in one particular embodiment of the invention it is also possible for the outer layer C to use polymers which are the same as those used for the outer layer A.

Metal Adhesion Properties

The desired metal adhesion properties, and the desired quality of the metallic layer (no cracking) are obtained in the film of the invention by combining the properties of the copolyester used for the metal-adherent outer layer A with a layer thickness in the range $\leq 1.6$ $\mu$m, preferably $\leq 1.2$ $\mu$m, particularly preferably $\leq 0.8$ $\mu$m.

The metal adhesion of $\geq 4$ N/25 mm is achieved if the copolymers described in some detail above are used for the metal-adherent outer layer A. The metal-adherent outer layer A may be modified for the handling of the film and for processability. This is advantageously achieved by adding, to the metal-adherent layer, a certain amount of suitable antiblocking agents with a selected particle size, specifically so as on the one hand to minimize blocking and on the other hand not significantly to impair metal adhesion.

The metal adhesion is essentially independent of the thickness of the outer layer. However, it has been found that excessive layer thickness can lead to cracking in the metallic layer after metallization. Surprisingly, it has been found that films with outer layers in the range >1.6 $\mu$m have a marked tendency toward cracking. The thickness set for the metal-adherent outer layer A of the film of the invention is therefore less than or equal to 1.6 $\mu$m. This cracking can be detected visually, e.g. in a light box or in the beam of light from a slide projector, and leads to impairment of the barrier properties of the metallized film with respect to atmospheric oxygen and flavors.

The base layer B may also comprise additives, such as stabilizers and/or anti-blocking agents. The two other, outer, layers A and C also comprise additives, such as stabilizers and/or antiblocking agents. It is appropriate for the additives to be added to the polymer or to the polymer mixture before melting begins. Examples of stabilizers used are phosphorus compounds, such as phosphoric acid or phosphoric esters.

Typical antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc or manganese salts of the dicarboxylic acids used, carbon black, titanium dioxide, kaolin or crosslinked polystyrene particles or crosslinked acrylate particles.

The antiblocking agents selected may also be mixtures of two or more different antiblocking agents or mixtures of antiblocking agents of the same composition but different particle size. The particles may be added to the individual layers at the respective advantageous concentrations, e.g. as a glycolic dispersion during the polycondensation or by way of masterbatches during extrusion.

Preferred particles are $SiO_2$ in colloidal or in chain form. These particles become very well bound into the polymer matrix and create only very few vacuoles. Vacuoles generally cause haze and it is therefore appropriate to avoid these. There is no restriction in principle on the diameters of the particles used. However, it has proven appropriate for achieving the object to use particles with an average primary particle diameter in the range less than or equal to 100 nm, preferably less than or equal to 60 nm and particularly preferably less than or equal to 50 nm measured by the sedigraph method, and/or particles with an average primary particle diameter in the range greater than or equal to 1 $\mu$m, preferably greater than or equal to 1.5 $\mu$m, particularly preferably greater than or equal to 2 $\mu$m measured by the screening method. However, the average particle diameter of these particles described last should not be above 5 $\mu$m.

To achieve the abovementioned properties of the metal adherent film, it has also proven to be appropriate to select the amount of antiblocking agent in the base layer B to be lower than in the two outer layers A and C. In a three-layer film of the type mentioned the amount of antiblocking agent in the base layer B will be very low: from 0 to 0.15% by weight, preferably from 0 to 0.12% by weight and in particular from 0 to 0.10% by weight. There is no restriction in principle on the particle size of the antiblocking agents used in the base layer B, but particular preference is given to antiblocking agents with an average particle size greater than or equal to 1 $\mu$m.

To achieve the property profile mentioned for the film, in one particularly useful embodiment, the outer layers A and C have more pigments (i.e. larger amounts of antiblocking agents) than the base layer B. The pigment concentration in these outer layers A and C is in the range from 0.0 to 1.0% by weight, advantageously from 0.02 to 0.8% by weight, in particular from 0.03 to 0.6% by weight. The two outer layers A and C may have the same amount of antiblocking agent, or the amount in the metal-adherent outer layer A may be selected to be lower than in the non-metal-adherent outer layer C, in order to improve the properties as desired or to further optimize processing behavior.

In its advantageous usage form, the film is composed of three layers, the base layer B and, applied on both sides of this base layer B, outer layers A and C.

Between the base layer B and the outer layers A and C there may, where appropriate, also be an intermediate layer arranged. This may again be composed of the polymers described for the base layer B. In one particularly preferred embodiment, it is composed of the polyester used for the base layer B. It may also comprise the additives described. The thickness of the intermediate layer is generally greater than or equal to 0.3 $\mu$m, preferably in the range from 0.5 to 15 $\mu$m, in particular in the range from 1.0 to 10 $\mu$m and very particularly preferably in the range from 1.0 to 5 $\mu$m.

In the particularly advantageous three-layer embodiment of the novel film, the thickness of the outer layer C is in the range greater than or equal to 0.1 μm, preferably in the range from 0.2 to 4.0 μm, advantageously in the range from 0.2 to 3.5 μm, in particular in the range from 0.3 to 3 μm, very particularly preferably in the range from 0.3 to 2.5 μm, and the thicknesses of the outer layers A and C may be identical or different.

The total thickness of the novel polyester film may vary within certain limits. The total thickness of the film is in the range from 3 to 80 μm, in particular from 4 to 50 μm, preferably from 5 to 30 μm, and the proportion made up by the base layer B is preferably from 5 to 95% of the total thickness of the film.

The polymers for the base layer B and the outer layers A and C are fed to three separate extruders. Any foreign bodies or contamination present may be removed from the polymer melt by suitable filters prior to extrusion. The melts are then shaped in a coextrusion die to give flat sheets of melt and are laminated together, and the composite film is then drawn off with the aid of an internally cooled chill roll made from polished stainless steel and, where appropriate, with the aid of other rollers, and solidified to give an amorphous prefilm.

The invention therefore also provides a process for producing the novel polyester film by the coextrusion process known per se.

The procedure for this process is that the melts corresponding to the individual layers of the film are coextruded through a flat-film die, the resultant film is drawn off for solidification on one or more rolls, the film is then biaxially stretched (oriented), and the biaxially stretched film is heat-set and, if desired, corona- or flame-treated on the surface layer intended for treatment.

The biaxial stretching is generally carried out sequentially, preferably stretching first longitudinally (in the machine direction) and then transversely (perpendicularly to the machine direction). This gives orientation of the molecular chains. The longitudinal stretching can be carried out with the aid of two rolls rotating at different speeds corresponding to the desired stretching ratio. For the transverse stretching use is made of an appropriate tenter frame.

The temperature at which the stretching is carried out may vary over a relatively wide range and depends on the film properties desired. The longitudinal stretching is generally carried out at a temperature in the range from 80 to 130° C., and the transverse stretching in the range from 80 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. After the longitudinal stretching and prior to the transverse stretching, one or both surfaces of the film may be coated in-line by known processes. The in-line coating may serve, for example, to give improved adhesion of any printing ink applied, or else to improve antistatic performance or processing performance.

In one advantageous embodiment of the film of the present invention, it proves to be useful to select a planar orientation Δp of the film which is not excessively high. It should then be in the range $\Delta p \leq 0.168$, preferably $\Delta p \leq 0.166$, and particularly preferably $\Delta p \leq 0.163$. In this case the strength of the film in the direction of its thickness is sufficiently high for the high metal adhesion value to be applied to the entire film without any initiation and propagation of tearing in the film.

The significant variables affecting the planar orientation Δp have been found to be the longitudinal and transverse stretching parameters, and also the SV of the raw material used. The processing parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed and the nature of the stretching, in particular that in the longitudinal direction of the machine. For example, if the planar orientation Δp obtained with a machine is 0.169 with the following set of parameters: $\lambda_{MD}$ =4.8 and $\lambda_{TD}$ =4.0, a longitudinal stretching temperature $T_{MD}$ of from 80–115° C. and a transverse stretching temperature $T_{TD}$ of from 80–125° C., then increasing the longitudinal stretching temperature $T_{MD}$ to 80–125° C. or increasing the transverse stretching temperature $T_{TD}$ to 80–135° C., or lowering the longitudinal stretching ratio $\lambda_{MD}$ to 4.3 or lowering the transverse stretching ratio $\lambda_{TD}$ to 3.7 gives a planar orientation Δp within the desired range. The film web speed here is 340 m/min and the SV (standard viscosity) of the material is about 730. The temperatures given for longitudinal stretching are based on the temperatures of the respective rollers, and those given for transverse stretching are based on the film temperatures measured by IR.

In the heat-setting which follows, the film is held for from 0.1 to 10 s at a temperature of from about 150 to 250° C. The film is then wound up in a usual manner.

The film may also be coated in order to achieve other desired properties. Typical coatings are layers with adhesion-promoting, antistatic, slip-improving or release action. These additional layers may, of course, be applied to the film by way of in-line coating, using aqueous dispersions, prior to the transverse stretching step.

Advantages of the Invention

The film of the invention has excellent metal adhesion, very good handling properties, and very good processing performance.

In addition, it has been ensured that during production of the film it is possible to reintroduce the regrind into the extrusion process in amounts of up to 60% by weight, based on the total weight of the film, without any significant adverse effect on the physical properties of the film.

The film therefore has excellent suitability for use in flexible packaging, and specifically wherever excellent metal adhesion is highly important, for example in what are known as bag-in-box packs, in which a multilayer composite is used, made from metallized PET, laminated to both sides of which there is a polyethylene film.

The table below (table 1) gives once again the most important film properties according to the invention. Table 1

| OUTER LAYER A | Ranges of the Present Invention | | | Unit | Test |
|---|---|---|---|---|---|
| | General | Preferred | Particularly Preferred | | |
| Metal adhesion | >4 | >4.5 | >5 | N/25 mm | internal |
| Cracking | none | | | number | |
| Planar orientation | ≦0.168 | ≦0.166 | ≦0.163 | | internal |

The following test methods were used to characterize the raw materials and the films:

SV (standard viscosity)

Standard viscosity SV (DCA) is determined at 25° C. in dichloroacetic acid by a method based on DIN 53726.

Intrinsic viscosity (IV) is calculated from the standard viscosity as follows $$IV=[\eta]=6.907 \cdot 10^{-4} SV\ (DCA)+0.063096\ [dl/g]$$

Metal Adhesion

Prior to adhesive bonding, a specimen of film of the present invention (300 mm longitudinally ×180 mm transversely) is placed on a smooth piece of card (200 mm longitudinally ×180 mm transversely, about 400 g/m², bleached, outer laps coated). The overlapping margins of the film are folded back onto the reverse side and secured with adhesive tape.

For the adhesive bonding of the film according to the present invention, use is made of a standard polyester film of 12 μm thickness (e.g. Melinex 800) and of a doctor device and doctor bar No. 3 from Erichsen, applying about 1.5 ml of adhesive (Novacote NC 275+CA 12, mixing ratio: 4/1+7 parts of ethyl acetate) to the outer layer A of the film of the present invention. After aerating to remove the solvent (4 min), the standard polyester film is laminated to outer layer A of the film of the present invention using a metal roller (width 200 mm, diameter 90 mm, weight 10 kg, to DIN EN 20 535). The lamination parameters are:

| | |
|---|---|
| Amount of adhesive: | 5 +/− 1 g/m² |
| Aeration after adhesive application: | 4 min +/− 15 s |
| Doctor thickness (Erichsen): | 3 |
| Doctor speed level: | about 133 mm/s |
| Bond curing time: | 2 h at 70° C. in a circulating air drying cabinet |

A 25±1 mm strip cutter is used to take specimens about 100 mm in length. About 50 mm of composite is needed here, and 50 mm of unbonded separate laps for securing/clamping the test specimen. The test specimens are secured to a sheet metal support by means of double-sided adhesive tape, by way of the entire surface of the reverse side of the film of the present invention (base layer B or outer layer C). The sheet with the composite adhesively bonded thereto is clamped into the lower clamping jaw of the tensile test machine. The clamp separation is 100 mm. The unlaminated end of the standard polyester film is clamped into the upper clamping jaw of the tensile test machine (Type: Zwick) so that the resultant peel angle is 180°. The average peel force needed to separate the composite at a separation rate of 100 mm/min in N/25 mm, is given rounded to one decimal place.

| | |
|---|---|
| Specimen width: | 25 mm |
| Pretensioning force: | 0.1 N |
| Test length: | 25 mm |
| Separation rate until pretensioning force applied: | 25 mm/min |
| Start position: | 5 mm |
| Test displacement: | 40 mm |
| Sensitivity: | 0.01 N |
| Separation rate: | 100 mm/min |

The peel force test result is equivalent to the minimum adhesion between the layers, since the adhesion between the adhesive and the standard film is markedly greater.

Coefficient of Friction

The coefficient of friction was determined to DIN 53 375, 14 days after production.

Determination of Planar Orientation Δp

Planar orientation is determined by measuring the refractive index with an Abbe refractometer, to the internal plant specification.

Preparation of specimens

Specimen size and length: from 60 to 100 mm

Specimen width: corresponds to prism width of 10 mm

To determine $n_{MD}$ and $n_a$ ($=n_z$), the specimen to be tested has to be cut out from the film with the running edge of the specimen running precisely in the TD. To determine $n_{TD}$ and $n_a$ ($=n_z$), the specimen to be tested has to be cut out from the film with the running edge of the specimen running precisely in the MD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in the TD is firstly laid on top of this, in such a way that the entire surface of the prism is covered. Using a paper wipe, the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction.

The scale is now turned using the lower knurled screw until the range visible in the eyepiece is from 1.49 to 1.50.

The refractive index $n_a$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is placed on the crossing point of the two diagonal lines using the lower knurled screw, and the value indicated on the scale is read off and entered into the table.

The specimen is then turned, and the corresponding refractive indices $n_{MD}$ and $n_a$ ($=n_z$) of the other side are measured and entered into an appropriate table.

After determining the refractive indices in, respectively, the MD and the direction of thickness, the specimen strip cut out in the MD is placed in position and the refractive indices $n_{TD}$ and $n_a$ ($=n_z$) are determined accordingly. The strip is turned over, and the values for the B side are measured. The values for the A side and the B side are combined to give average refractive indices. The orientation values are then calculated from the refractive indices using the following formulae:

$$\Delta n=n_{MD}-n_{TD} \quad \Delta p=(n_{MD}+n_{TD})/2-n_z \quad n_{av}=(n_{MD}+n_{TD}+n_z)/3$$

EXAMPLE 1

Chips made from polyethylene terephthalate (prepared by the transesterification process with Mn as transesterification catalyst, Mn concentration: 100 ppm) were dried at 150° C. to residual moisture below 100 ppm and fed to the extruder for the base layer B. Chips made from polyethylene terephthalate were likewise fed, with a filler, to the extruder for the non-metal-adherent outer layer C.

Alongside this, chips were prepared made from a linear polyester which is composed of an amorphous copolyester with 78 mol % of ethylene terephthalate and 22 mol % of ethylene isophthalate (prepared via the transesterification process with Mn as transesterification catalyst, Mn concentration: 100 ppm). The copolyester was dried at a temperature of 100° C. to a residual moisture below 200 ppm and fed to the extruder for the metal-adherent outer layer A.

Coextrusion followed by stepwise longitudinal and transverse orientation is used to produce a transparent three-layer film with ABC structure and with a total thickness of 12 μm. The thickness of each outer layer can be found in table 2.

Outer layer A was a mixture made from:

97.0% by weight of copolyester with SV of 800
3.0% by weight of masterbatch made from 97.75% by weight of copolyester (SV of 800) and 1.0% by weight of ®Sylobloc 44 H (synthetic SiO$_2$ from Grace) and 1.25% by weight of ®Aerosil TT 600 (pyrogenic SiO$_2$ from Degussa)

Base layer B:

100.0% by weight of polyethylene terephthalate with SV of 800

Outer layer C was a mixture made from:

88% by weight of polyethylene terephthalate with SV of 800
12% by weight of masterbatch made from 97.75% by weight of copolyester (SV of 800) and 1.0% by weight of Sylobloc 44 H (synthetic SiO$_2$ from Grace) and 1.25% by weight of Aerosil TT 600 (pyrogenic SiO$_2$ from Degussa)

The processing conditions in each step of the process were:

| | Temperatures | |
|---|---|---|
| Extrusion: | Layer A: | 270° C. |
| | Layer B: | 290° C. |
| | Layer C: | 290° C. |
| | Die width: | 2.5 mm |
| | Take-off roll temperature: | 30° C. |

| | -continued | |
|---|---|---|
| Longitudinal stretching: | Temperature: | 80–125° C. |
| | Longitudinal stretching ratio: | 4.2 |
| Transverse stretching: | Temperature: | 80–135° C. |
| | Transverse stretching ratio: | 4.0 |
| Heat-setting: | Temperature: | 230° C. |
| | Duration: | 3 s |

The film had a metal adhesion of 6.6 N/25 mm and exhibits the desired handling properties and the desired processing performance. The structure of the film and the properties achieved in films produced in this way are shown in tables 2 and 3.

EXAMPLE 2

The thickness of the metal-adherent outer layer A was increased over example 1. The metal adhesion remained good, but in the light box the first cracking could be detected in the metal layer after metallization.

EXAMPLE 3

The molar ratio used of the copolyester was different from that of example 1:60 mol % of ethylene terephthalate units and 40 mol % of ethylene isophthalate units. This caused a slight deterioration in metal adhesion, which was 6.0 N/25 mm.

Comparative Example 1c

Example 1 from EP-A-0 144 878 was repeated. The metal adhesion of the film was 3.0 N/25 mm.

Comparative Example 2c

Example 1 from EP-A-0 035 838 was repeated. The base layer used polyethylene terephthalate and the outer layer used a polymer having 82 mol % of ethylene terephthalate and 18 mol % of ethylene isophthalate as acid component. SiO$_2$ with a weight-average diameter of 1 μm was introduced into the outer layer at a concentration of 0.25% by weight, based on the weight of the outer layer. The outer layer had a thickness of 2.25 μm, while the total thickness of the film was 15 μm. After metallization, cracking in the metallic layer could be detected in the light box.

TABLE 2

| Example | Film thickness mm | Layer thicknesses mm | | | Film structure | Metal adhesion N/25 mm | Performance in metal adhesion test | Δp |
|---|---|---|---|---|---|---|---|---|
| | | A | B | C | | | | |
| E1 | 12 | 0.7 | 9.8 | 1.5 | ABC | 6.6 | Separation over entire area | 0.166 |
| E2 | 12 | 0.9 | 9.6 | 1.5 | ABC | 6.6 | Separation over entire area | 0.166 |
| E3 | 12 | 0.9 | 9.6 | 1.5 | ABC | 6.0 | Separation over entire area | 0.166 |
| 1c | 12 | 0.75 | 9.75 | 1.5 | ABC | 3.0 | Tearing initiated in film during test | 0.166 |
| 2c | 15 | 2.25 | 12.25 | — | AB | 6.4 | Separation over entire area | 0.164 |

What is claimed is:

1. A coextruded, biaxially oriented polyester film with high metal adhesion made from a base layer B and from at least one metal-adherent outer layer A applied to the base layer B, wherein the metal-adherent outer layer A has a metal adhesion of ≧4 N/25 mm and a thickness of ≦1.6 μm and consists essentially of an amorphous copolyester built up from ethylene terephthalate units and ethylene isophthalate units and from ethylene glycol units.

2. The polyester film as claimed in claim 1, wherein the amorphous copolyester of the metal-adherent outer layer A contains from 40 to 99 mol % of ethylene tereplithalate and from 60 to 1 mol % of ethylene isophthalate.

3. The polyester film as claimed in claim 1, wherein the film has a three-layer structure with a base layer B, a metal-adherent outer layer A and another outer layer C, where the outer layer C is identical with or different from the outer layer A.

4. The polyester film as claimed in claim 3, wherein the outer layers A and C comprise stabilizers or antiblocking agents or a mixture of stabilizers and antiblocking agents, and wherein the antiblocking agents comprise particles with an average primary particle diameter greater than or equal to 1 $\mu$m, and wherein the concentration of particles in the outer layers A and C is higher than the concentration of particles in the base layer B, the particle concentration in the outer layers A and C being in the range from 0.02 to 1.0% by weight.

5. The polyester film as claimed in claim 3, wherein the thickness of the outer layer C is greater than or equal to 0.1 $\mu$m, and the thicknesses of the outer layers A and C is identical or different.

6. The polyester film as claimed in claim 1, wherein the base layer B also comprises additives.

7. The polyester film as claimed in claim 6, wherein the additive is a stabilizer or an antiblocking agent or a mixture of a stabilizer and an antiblocking agent.

8. The polyester film of claim 7, wherein the amount of antiblocking agent in the bas e layer B is in the range from 0 to 0.15% by weight.

9. The polyester film of claim 7, wherein the average particle size of the antiblocking agents in the base layer B is greater than or equal to 1 $\mu$m.

10. The polyester film as claimed in claim 1, wherein the total thickness of the film is in the range from 3 to 80 $\mu$m, and the proportion made up by the base layer B is in the range from 5 to 95% of the total thickness of the film.

11. The polyester film as claimed in claim 1, wherein the planar orientation $\Delta p$ of the film is $\Delta p \leq 0.168$.

12. A process for producing a polyester film as claimed in claim 1, in which the polymers for the base layer B and the outer layer or outer layers are fed to separate extruders, the melts are then shaped in a coextrusion die to give a flat melt multilayered film, and the multilayered film is then drawn off and solidified to give an amorphous prefilm, and the prefilm is then biaxially stretched through a longitudinal and transverse stretching process, heat-set and wound up, which process comprises carrying out the longitudinal stretching at a temperature in the range from 80 to 130° C. and carrying out the transverse stretching in the range from 80 to 150° C., and which comprises setting the longitudinal stretching ratio in a range from 2.5:1 to 6:1, and setting the transverse stretching ratio in a range from 3.0:1 to 5.0:1.

13. The process as claimed in claim 12, wherein, after the longitudinal stretching and prior to the transverse stretching, one or both surfaces of the film are coated in-line.

14. The process as claimed in claim 12 or 13, wherein cut material produced during film production is reintroduced to the extrusion process as regrind in amounts in the range from 20 to 60% by weight, based on the total weight of the film.

* * * * *